(12) United States Patent
Hironaka (10) Patent No.: US 10,139,004 B2
(45) Date of Patent: Nov. 27, 2018

(54) SOLENOID VALVE

(71) Applicant: KYB Corporation, Tokyo (JP)

(72) Inventor: Tsuyoshi Hironaka, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/508,713

(22) PCT Filed: Aug. 24, 2015

(86) PCT No.: PCT/JP2015/073711
§ 371 (c)(1),
(2) Date: Mar. 3, 2017

(87) PCT Pub. No.: WO2016/035595
PCT Pub. Date: Mar. 10, 2016

(65) Prior Publication Data
US 2017/0276253 A1 Sep. 28, 2017

(30) Foreign Application Priority Data
Sep. 4, 2014 (JP) .................. 2014-180516

(51) Int. Cl.
*F16K 49/00* (2006.01)
*F16K 31/06* (2006.01)
*F16K 27/04* (2006.01)
*F16K 27/08* (2006.01)
(Continued)

(52) U.S. Cl.
CPC ............ *F16K 11/07* (2013.01); *F16K 27/048* (2013.01); *F16K 27/08* (2013.01); *F16K 31/06* (2013.01); *F16K 31/0668* (2013.01); *F16K 49/00* (2013.01); *H01F 7/16* (2013.01)

(58) Field of Classification Search
CPC .... F16K 49/00; F16K 31/061–31/0617; F16K 31/0668; F16K 27/048; F16K 27/08
USPC ......... 137/334, 339, 596.17, 601.14, 625.34; 251/129.22; 335/300; 222/146.6
See application file for complete search history.

(56) References Cited

U.S. PATENT DOCUMENTS

| 1,270,170 A | * | 6/1918 | Kingsbury | .............. F16K 49/00 |
| | | | | 137/339 |
| 2,157,480 A | * | 5/1939 | Cole | .................. F02M 51/0685 |
| | | | | 137/334 |
| 4,610,267 A | * | 9/1986 | Beck | ..................... F16K 11/048 |
| | | | | 137/596.17 |

(Continued)

FOREIGN PATENT DOCUMENTS

| DE | 2751230 A1 | 5/1979 |
| EP | 1277694 A2 | 1/2003 |

(Continued)

*Primary Examiner* — Mary McManmon
*Assistant Examiner* — Jonathan Waddy
(74) *Attorney, Agent, or Firm* — Rabin & Berdo, P.C.

(57) ABSTRACT

A solenoid valve includes a housing having a valve passage; a spool configured to switch between an open and closed state of the valve passage; a coil part configured to generate magnetic force when electric current flows therethrough; a yoke surrounding the coil part; a fluid passage provided on an outer side of the coil part, through which the working fluid passes; an introduction passage communicating with the fluid passage to guide the working fluid inside the housing to the fluid passage; and a discharge passage communicating with the fluid passage to discharge the working fluid passed through the fluid passage outside the yoke.

14 Claims, 3 Drawing Sheets

(51) Int. Cl.
*F16K 11/07* (2006.01)
*H01F 7/16* (2006.01)

(56) References Cited

U.S. PATENT DOCUMENTS

| | | | | |
|---|---|---|---|---|
| 4,711,397 | A * | 12/1987 | Lahiff | F02M 51/065 239/125 |
| 5,566,921 | A * | 10/1996 | Yokota | F02M 59/466 239/585.3 |
| 5,605,178 | A * | 2/1997 | Jennins | F16K 31/082 137/625.65 |
| 5,785,087 | A * | 7/1998 | Takahashi | F15B 13/0402 137/238 |
| 5,809,977 | A * | 9/1998 | Krimmer | F02M 25/0836 123/516 |
| 6,029,704 | A * | 2/2000 | Kuroda | F16K 31/0613 137/625.65 |
| 6,347,616 | B1 * | 2/2002 | Rodriguez | F02M 25/0836 123/520 |
| 6,843,271 | B2 * | 1/2005 | Weldon | F16K 24/04 123/516 |
| 7,210,496 | B2 * | 5/2007 | Suzuki | F16K 1/302 137/338 |
| 2012/0018656 | A1 * | 1/2012 | Holmes | F16K 11/07 251/129.15 |
| 2012/0292542 | A1 * | 11/2012 | Mizui | F16K 31/06 251/129.15 |
| 2017/0045152 | A1 * | 2/2017 | Bleeker | F16K 31/002 |

FOREIGN PATENT DOCUMENTS

| | | |
|---|---|---|
| JP | S64-57473 U | 4/1989 |
| JP | H03-117178 U | 12/1991 |
| JP | 2006-196530 A | 7/2006 |
| JP | 2011-038630 A | 2/2011 |
| JP | 2012-229738 A | 11/2012 |

* cited by examiner

SOLENOID VALVE

TECHNICAL FIELD

The present invention relates to a solenoid valve.

BACKGROUND ART

Solenoid valves generate attraction force (directed to a stator core) with respect to a plunger by magnetic force being generated upon passing electric current through a coil, to move a valve body due to a balance between the attraction force acting via the plunger and energizing force generated by an energizing member.

JP2012-229738A discloses a solenoid valve including a sleeve having a plurality of fluid passages provided on a cylinder wall, a fixed iron core integrally engaged to the sleeve via a body, a spool that switches the fluid passages by reciprocal movement within the sleeve, a plunger disposed in series to an axis center direction of the spool and inserted in the body in a slidable manner, a case for retaining a hollow cylindrical core supporting the plunger and a coil that provides electromagnetic force, and a spring that biases the spool towards the plunger.

SUMMARY OF INVENTION

In the solenoid valve disclosed in JP2012-229738A, the coil may generate heat due to electricity passing through the coil. When the amount of heat generated by the coil increases, heat may accumulate inside the case, and the coil temperature may increase.

An object of the present invention is to prevent the coil from increasing in temperature in a solenoid valve.

According to one aspect of the present invention, a solenoid valve for controlling flow rate of working fluid, includes a housing having a valve passage through which working fluid flows; a valve body provided inside the housing in a movable manner, the valve body being configured to switch between an open and closed state of the valve passage; a coil part configured to generate magnetic force when electric current flows therethrough; a yoke surrounding the coil part; a stator core provided on an inner side of the coil part, the stator core being excited by magnetic force of the coil part; a shaft provided to be movable along an axial direction with the valve body; a plunger fixed to the shaft, the plunger being configured to be movable in an axial direction by attraction force acting between the plunger and the stator core; a fluid passage provided on an outer side of the coil part, through which the working fluid passes; an introduction passage communicating with the fluid passage, the introduction passage being configured to guide the working fluid inside the housing to the fluid passage; and a discharge passage communicating with the fluid passage, the discharge passage being configured to discharge the working fluid passed through the fluid passage outside the yoke.

According to one aspect of the present invention, a solenoid valve for controlling flow rate of working fluid, includes a housing having a valve passage through which working fluid flows; a valve body provided inside the housing in a movable manner, the valve body being configured to switch between an open and closed state of the valve passage; a coil part configured to generate magnetic force when electric current flows therethrough; a yoke surrounding the coil part; a stator core provided on an inner side of the coil part, the stator core being configured to be excited by magnetic force of the coil part; a shaft provided to be movable along an axial direction with the valve body; a plunger fixed to the shaft, the plunger being configured to be movable in an axial direction by attraction force acting between the plunger and the stator core; a fluid passage provided on an outer side of the coil part, through which the working fluid passes; an introduction passage communicating with the fluid passage, the introduction passage being configured to guide the working fluid inside the housing to the fluid passage; and a discharge passage communicating with the fluid passage, the discharge passage being configured to discharge the working fluid passed through the fluid passage outside the yoke.

DESCRIPTION OF EMBODIMENTS

The following describes embodiments of the present invention, with reference to drawings.

A solenoid valve controls a flow rate of working fluid guided from a fluid pressure supply source (illustration omitted) to fluid pressure apparatus (illustration omitted). In each of the following embodiments, descriptions are provided for a case in which the working fluid is working oil. The working fluid is not limited to the working oil, and may be other incompressible fluid or compressible fluid.

First Embodiment

Figure 1:
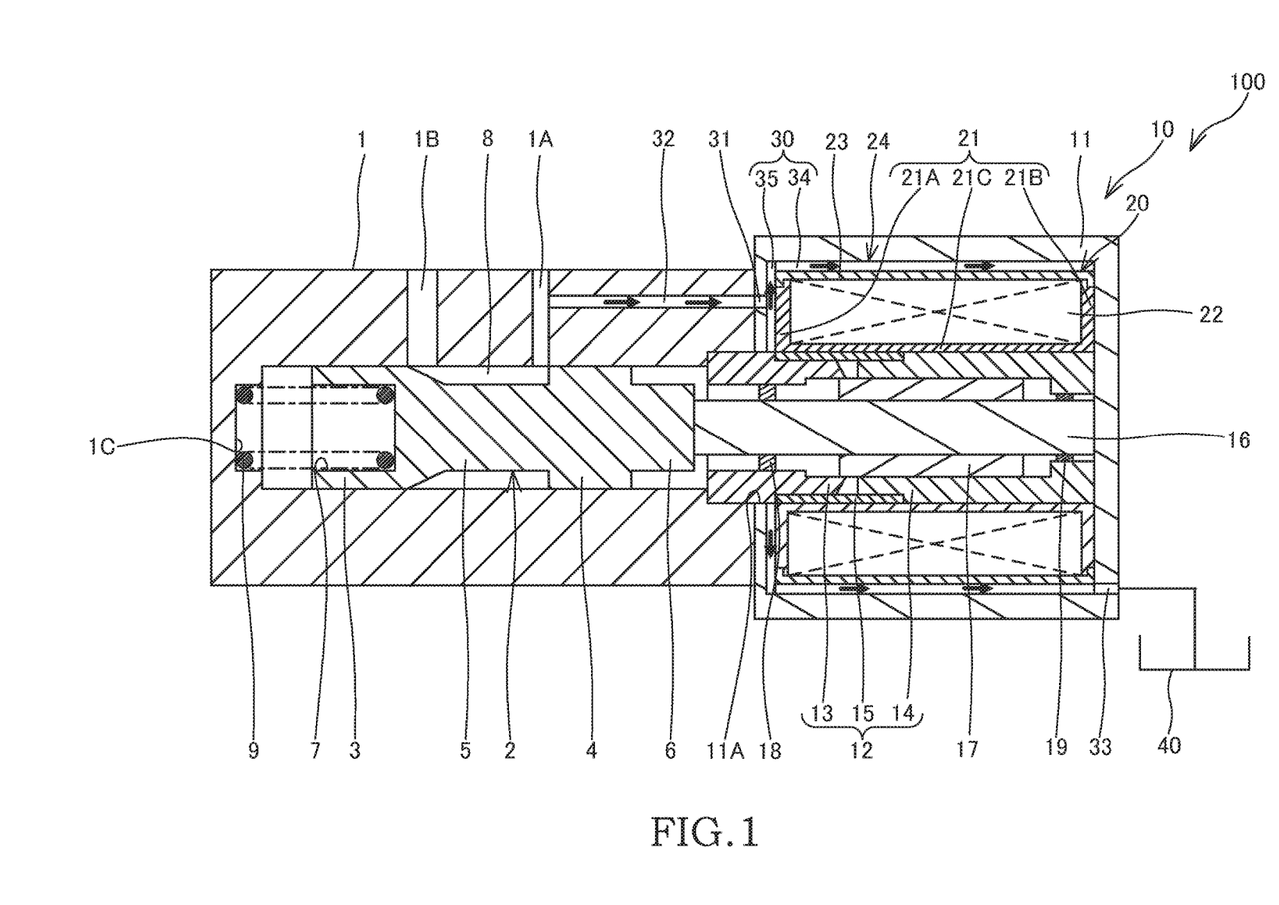
FIG. 1 is a cross sectional view of a solenoid valve according to a first embodiment of the present invention.

First described with reference to FIG. 1 is an overall structure of a solenoid valve 100 according to a first embodiment of the present invention.

As shown in FIG. 1, the solenoid valve 100 includes a bottomed hollow cylindrical housing 1, a spool 2 disposed movable inside the housing 1 as a valve body, and a coil spring 9 disposed inside the housing 1 as an biasing member configured to bias the spool 2.

In the housing 1, an inlet passage 1A and an outlet passage 1B are formed next to each other along an axial direction, as valve passages through which the working oil flows. The inlet passage 1A communicates with an inner space of the housing 1, and communicates with a fluid pressure supply source via a pipe or the like not illustrated, to guide the working oil to the inner space of the housing 1. The outlet passage 1B communicates with the inner space of the housing 1, and communicates with hydraulic equipment via a pipe or the like not illustrated, to guide the working oil flowing out from the inner space of the housing 1 to the hydraulic apparatus.

The spool 2 has a first land part 3 and a second land part 4 that move in a sliding manner along an inner circumferential surface of the housing 1, a small-diameter part 5 whose outer diameter is formed to have a smaller diameter than the first land part 3 and second land part 4, and that connects the first land part 3 with the second land part 4, and a tip end part 6 that comes into contact with a shaft 16 of a solenoid part 10 later described.

An end part of the first land part 3 has a spring-accommodating recessed part 7 formed therein, in which a part of the coil spring 9 is accommodated. The second land part 4 moves in a sliding manner along the inner circumferential surface of the housing 1 and adjusts an opening of the inlet passage 1A. As such, the spool 2 switches the opening and closing of the inlet passage 1A and the outlet passage 1B that serve as valve passages, by the second land part 4.

The small-diameter part 5 is formed to have a smaller diameter than the outer diameter of the first land part 3 and second land part 4, and forms an annular fluid chamber 8 with the inner circumferential surface of the housing 1. The fluid chamber 8 allows the inlet passage 1A to communicate with the outlet passage 1B, and guides the working oil passed through the inlet passage 1A to the outlet passage 1B.

The coil spring 9 is installed between the spring-accommodating recessed part 7 of the first land part 3 of the spool 2 and a bottom part 1C of the housing 1, in a compressed state. The coil spring 9 energizes the spool 2 in a direction that the second land part 4 opens the inlet passage 1A (middle right direction in FIG. 1).

The solenoid valve 100 further includes a solenoid part 10 that drives the spool 2 in the axial direction.

The solenoid part 10 has a coil part 20 that generates magnetic force when an electric current is flowed therethrough, a cylindrical yoke 11 made from a magnetic material and which surrounds the coil part 20, a stator core 12 provided within the coil part 20, and that is configured to be excited by the magnetic force generated by the coil part 20, a shaft 16 movable along the axial direction together with the spool 2, and a plunger 17 fixed to the outer circumference of the shaft 16.

The yoke 11 is shaped to be a bottomed hollow cylinder form, and is fixed in contact with an end surface of the housing 1 on an opened side thereof. The end surface of the yoke 11 in contact with the housing 1 is formed with an opening 11A through which the stator core 12 is inserted.

The coil part 20 has a hollow cylindrical bobbin 21, a coil 22 wound around the bobbin 21, and that is configured to generate magnetic force when electric current passes therethrough, and a mold resin 23 surrounding the bobbin 21 and the coil 22 and being mold formed.

The bobbin 21 is formed in a hollow cylindrical shape having flange parts 21A and 21B on either end thereof. The coil 22 is formed by winding an electric wire around a middle part 21C between the flange parts 21A and 21B.

The coil 22 generates magnetic force by the flow of electric current supplied via a terminal (illustration omitted).

The mold resin 23 is formed integrally by molding, surrounding the bobbin 21 and coil 22. The mold resin 23 is a resin with excellent thermal conductivity as well as oil resistance.

The stator core 12 is a hollow cylindrical member provided on an inner side of the bobbin 21 in the coil part 20. The stator core 12 is constructed of a first stator core 13 inserted through the opening 11A of the yoke 11, the first stator core 13 being partially accommodated inside the valve body 1, a second stator core 14 disposed in series with the first stator core 13 having a gap between the first stator core 13, and a connecting member 15 that connects outer circumferences of the first stator core 13 and second stator core 14. The first stator core 13 and the second stator core 14 are formed from a magnetic material, and the connecting member 15 is formed from a non-magnetic material.

The shaft 16 is supported in a slidable manner in the axial direction by a first bearing 18 provided on an inner circumference of the first stator core 13 and a second bearing 19 provided on an inner circumference of the second stator core 14. The tip end of the shaft 16 comes into contact with the tip end part 6 of the spool 2. Accordingly, together with the movement of the shaft 16, the spool 2 moves.

The plunger 17 is formed from a magnetic material, and is fixed to the shaft 16 by caulking or like method to prevent any displacement with respect to the shaft 16. Attraction force acts on the plunger 17 to direct the plunger 17 towards the first stator core 13 by magnetic force of the coil 22.

Next, operations of the solenoid valve 100 will be described.

In a non-powered state in which no electric current flows through the coil 22 of the coil part 20, no attraction force acts on the plunger 17, and the spool 2 is biased in the direction that opens the inlet passage 1A (middle right direction in FIG. 1) by the biasing force of the coil spring 9. Therefore, as shown in FIG. 1, the inlet passage 1A communicates with the outlet passage 1B via the fluid chamber 8, thus allowing the pass of the working oil. That is to say, in a state in which no electric current is passed through the coil 22 of the coil part 20, the solenoid valve 100 is of a normally-open type in which the inlet passage 1A communicates with the outlet passage 1B.

When electric current flows through the coil 22 and magnetic force is generated, the plunger 17 becomes excited and attraction force in a direction towards the first stator core 13 (middle left direction in FIG. 1) acts on the plunger 17. That is to say, a force directed towards a direction compressing the coil spring 9 is applied to the spool 2 via the shaft 16.

The spool 2 moves to a position where the attraction force applied via the shaft 16 is balanced with the energizing force by the coil spring 9. As the magnitude of the electric current passing through the coil 22 increases, the attraction force acting between the plunger 17 and the first stator core 13 increases. Therefore, as the electric current value passed through the coil 22 increases, the spool 2 moves more in the direction compressing the coil spring 9, against the energizing force of the coil spring 9.

When the electric current value passed through the coil 22 is increased and the spool 2 is moved against the energizing force of the coil spring 9, the inlet passage 1A gradually closes due to the second land part 4. Accordingly, the opened area of the inlet passage 1A with respect to the fluid chamber 8 decreases. This thus reduces the flow rate of the working oil guided from the inlet passage 1A through the fluid chamber 8.

When the electric current value passed through the coil 22 is increased further to increase the amount of stroke of the plunger 17 towards the first stator core 13, the inlet passage 1A is completely closed due to the second land part 4. This thus blocks the communication between the inlet passage 1A and the outlet passage 1B.

As such, the solenoid valve 100 controls the electric current value passed through the coil 22 and moves the spool 2 in the axial direction, to adjust the flow rate of the working oil guided from the inlet passage 1A to the outlet passage 1B.

Next, a cooling passage 24 in the solenoid valve 100 will be described.

The solenoid valve 100 further includes a cooling passage 24 through which the working oil passes, to cool the coil part 20.

The cooling passage 24 has a fluid passage 30 provided on an outer side of the coil part 20, through which the working oil passes, an inlet 31 provided in the yoke 11 to be communicated with the fluid passage 30, an introduction passage 32 communicating with the fluid passage 30 via the inlet 31 to guide the working oil inside the housing 1 to the fluid passage 30, and a discharge passage 33 communicating with the fluid passage 30 to discharge the working oil passed through the fluid passage 30 externally of the yoke 11.

The fluid passage 30 has an annular first fluid passage 34 formed between an outer circumference of the mold resin 23 and an inner circumference of the yoke 11 in the coil part 20, and a second fluid passage 35 formed between an inner side of the end surface of the yoke 11 and the flange part 21A of the bobbin 21 to communicate the inlet 31 with the first fluid passage 34. As shown in FIG. 1, the second fluid passage 35 is formed as an annular gap between the inner side of the end surface of the yoke 11 and the flange part 21A of the bobbin 21. Instead of this, the second fluid passage 35 may be formed on the inner side of the yoke 11 as a groove extending towards a radial direction.

The inlet 31 is formed as a through hole on an end surface on a side in contact with the housing 1 among the end surfaces of the yoke 11, and communicates with the introduction passage 32 and the second fluid passage 35.

The introduction passage 32 is formed in the housing 1, and communicates with the inlet passage 1A as well as communicating with the second fluid passage 35 via the inlet 31. As such, by the introduction passage 32 communicating with the inlet passage 1A formed in the housing 1, the introduction passage 32 guides the working oil passing through the inlet passage 1A as the working oil inside the housing 1, to the fluid passage 30. Although a single introduction passage 32 is formed in the solenoid valve 100, it is not limited to this, and a plurality thereof may be formed. In a case in which a plurality of introduction passages 32 are formed, the inlet 31 and second fluid passage 35 are formed together with the introduction passage 32.

The discharge passage 33 is formed as a through hole on a bottom part of the yoke 11, and the discharge passage 33 discharges the working oil passed through the first fluid passage 34 of the fluid passage 30 to a tank 40 outside the yoke 11. That is to say, a portion of the working oil guided inside the valve body 1 from the tank 40 passes through the fluid passage 30, is guided again to the tank 40 via the discharge passage 33 and is recirculated. In a case in which a single introduction passage 32 and inlet 31 is formed, it is preferable that the discharge passage 33 is formed at the bottom part of the yoke 11 at a position shifted by 180 degrees in a circumferential direction of the yoke 11 with respect to where the inlet 31 is formed, as shown in FIG. 1. In this case, the working oil guided from the inlet 31 is recirculated from the discharge passage 33 to the tank 40 after passing through the outer circumference of the coil part 20 in a circumferential direction. This thus allows for efficiently cooling the entire coil part 20. The discharge passage 33 is not limited to this, and may be formed in any position.

Next, effects of the working oil passing through the cooling passage 24 will be described.

In the solenoid valve 100, the working oil circulates, as shown by the arrow in FIG. 1.

A portion of the working oil guided from the fluid pressure supply source to the inlet passage 1A is guided through the introduction passage 32 and the inlet 31 to the second fluid passage 35.

The working oil passed through the second fluid passage 35 is guided to the first fluid passage 34. The working oil passed through the first fluid passage 34 is recirculated to the tank 40 via the discharge passage 33 formed on the bottom part of the yoke 11.

As such, by providing the first fluid passage 34 and second fluid passage 35 on outer sides of the coil part 20 and passing the working oil through the outer circumference of the coil part 20, the entire coil part 20 is cooled.

The introduction passage 32, the fluid passage 30, and the discharge passage 33 are formed in shapes that do not greatly affect magnetic properties of the solenoid part 10 and the flow rate of the working oil passing through the solenoid valve 100. Therefore, it is possible to cool down the entire coil part 20 without affecting the performance of the solenoid valve 100 or the performance exerted by the fluid pressure equipment to which the working oil is guided by passing through the solenoid valve 100.

According to the above first embodiment, the following effects are achievable.

According to the solenoid valve 100, the working oil is guided via the introduction passage 32 to the second fluid passage 35 and first fluid passage 34 provided on outer sides of the coil part 20, and is recirculated from the discharge passage 33. The coil part 20 can thus be cooled by the flow of the working oil, which allows for preventing the temperature increase of the coil part 20.

Moreover, by preventing the temperature increase of the coil part 20, it is possible to prevent any breakage of the coil part 20 and change in resistance of the coil 22. This thus increases the durability of the solenoid valve 100, and together makes the control thereof easy.

In the above embodiment, the solenoid valve 100 is of a normally-open type in which the inlet passage 1A and the outlet passage 1B communicate with each other while no electricity is passed through. Moreover, the introduction passage 32 communicates with the inlet passage 1A. Therefore, even if the communication of the inlet passage 1A with the outlet passage 1B is completely blocked due to the pass of electricity through the coil 22, the introduction passage 32 can guide the working oil to the fluid passage 30. Accordingly, in a state in which electricity is passed through the coil 22, it is possible to cool the coil 22 at all times; this thus allows for preventing the temperature increase of the coil 22. It should be notable that the solenoid valve 100 may be a normally-open type, in which the introduction passage 32 is communicated with the outlet passage 1B.

Figure 2:
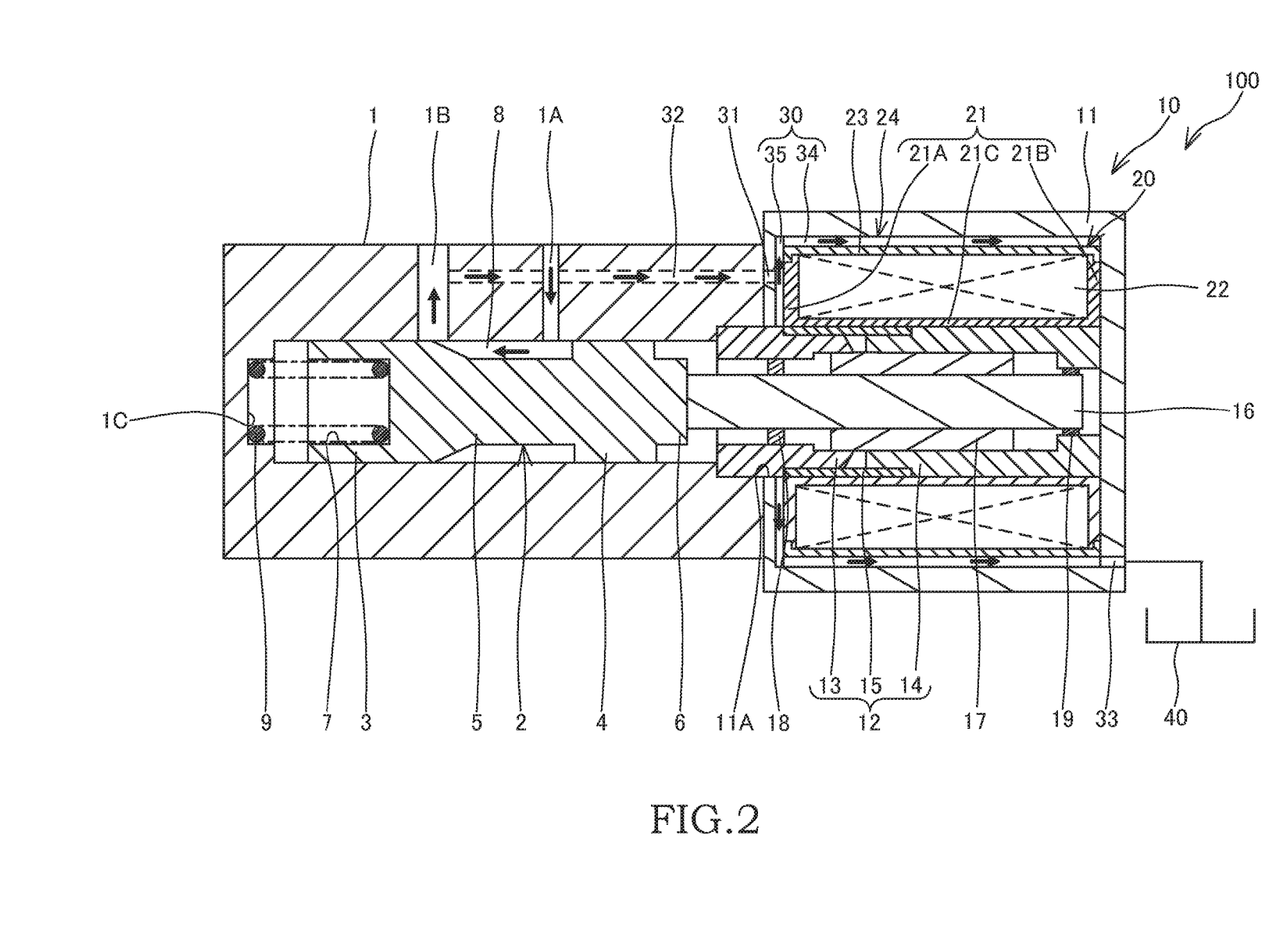
FIG. 2 is a cross sectional view showing a modification of a solenoid valve according to the first embodiment of the present invention.

Moreover, as shown in FIG. 2, the solenoid valve 100 may be of a normally-closed type in which the inlet passage 1A and the outlet passage 1B are disconnected in a state in which no electricity is passed through the coil 22 of the coil part 20. In this case also, the introduction passage 32 may communicate with the inlet passage 1A or communicate with the outlet passage 1B. When the solenoid valve 100 is of a normally-closed type, the inlet passage 1A and the outlet passage 1B communicates with each other when electricity is passed through the coil 22. Therefore, regardless of whether the introduction passage 32 is communicated with the inlet passage 1A or the outlet passage 1B, the working oil can be constantly guided to the fluid passage 30 in a state in which electricity is passed through the coil 22.

Second Embodiment

Figure 3:
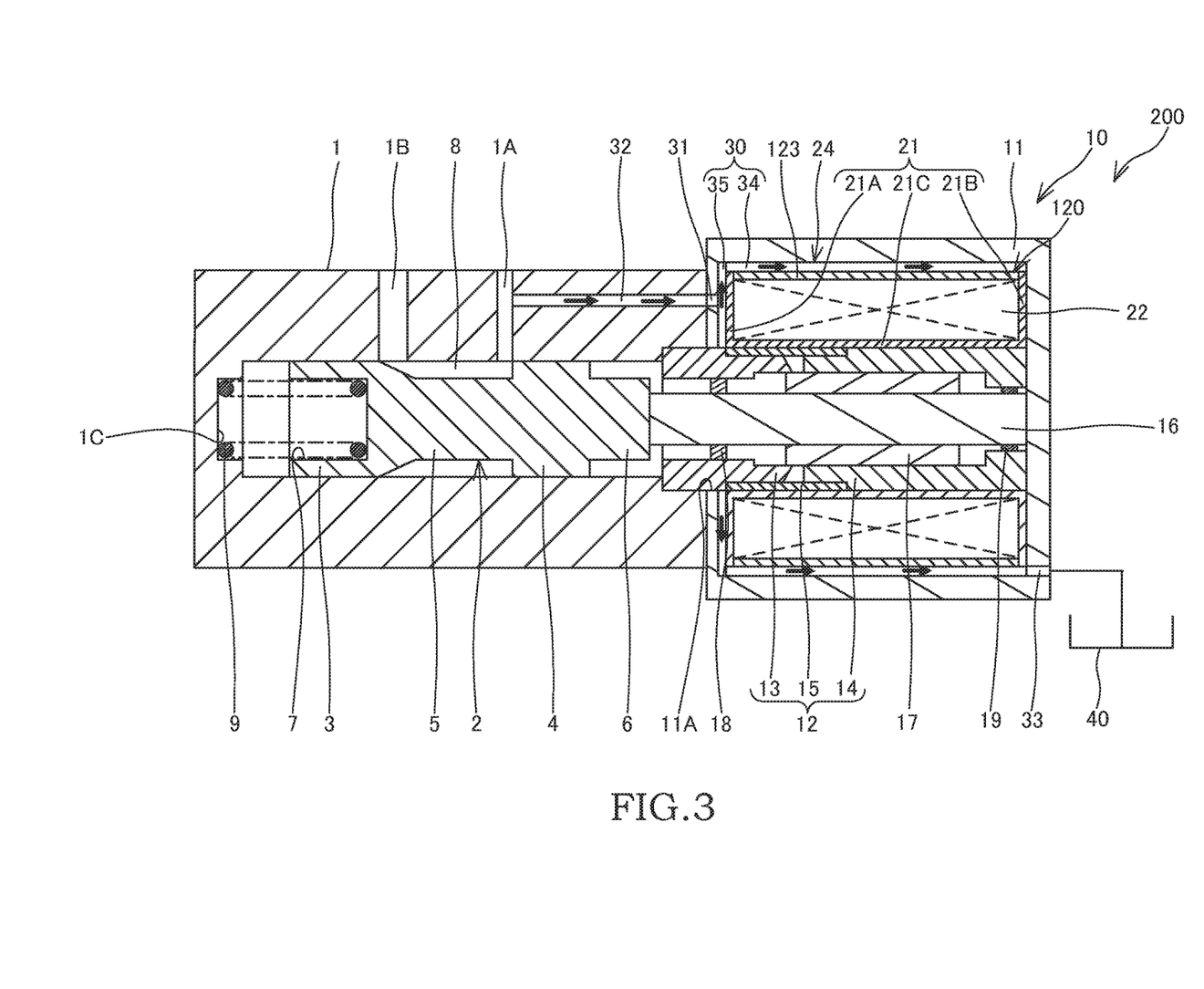
FIG. 3 is a cross sectional view of a solenoid valve according to a second embodiment of the present invention.

Next, a solenoid valve 200 according to a second embodiment of the present invention will be described with reference to FIG. 3. The following describes mainly on points different from the foregoing first embodiment; arrangements identical to the solenoid valve 100 of the first embodiment are provided with identical reference signs, and descriptions thereof have been omitted.

The solenoid valve 100 according to the first embodiment has a mold resin 23 in which the coil part 20 surrounds the bobbin 21 and coil 22, and is molded. In comparison, the solenoid valve 200 according to the second embodiment has no mold resin 23 that surrounds the bobbin 21 and coil 22 as shown in FIG. 3, and differs from the solenoid valve 100 according to the first embodiment in a point of having a sheet part provided covering an outer circumference of the coil 22.

The coil part 120 in the solenoid valve 200 has a cylindrical bobbin 21, a coil 22 wound around the bobbin 21 and which generates magnetic force when electric current is flowed therethrough, and a heat releasing sheet 123 as a sheet part that covers an outer circumference of the coil 22.

The heat releasing sheet 123 is provided covering the outer circumference of the coil 22 so that the coil 22 is not exposed. The heat releasing sheet 123 is formed from resin material having excellent thermal conductivity as well as oil resistance (for example, polyimide resin).

The first fluid passage 34 of the fluid passage 30 is formed between the outer circumference of the heat releasing sheet 123 and the inner circumference of the yoke 11, in the coil part 20.

A portion of the working oil guided from the fluid pressure supply source to the inlet passage 1A is, as with the solenoid valve 100 of the first embodiment, guided to the first fluid passage 34 via the introduction passage 32, inlet 31, and second fluid passage 35. The working oil passed through the first fluid passage 34 is recirculated to the tank 40 via the discharge passage 33 formed on the bottom part of the yoke 11.

As such, the entire coil part 120 is cooled by providing the first fluid passage 34 and the second fluid passage 35 on the outer sides of the coil part 120 and passing the working oil along the outer circumference of the coil part 120.

The first fluid passage 34 provided between the outer circumference of the heat releasing sheet 123 and the inner circumference of the yoke 11 is formed to provide no large influence on the magnetic properties of the solenoid valve 200 nor to the flow rate of the working oil passing through the solenoid valve 200, as with the first fluid passage 34 of the above first embodiment.

According to the solenoid valve 200 in accordance with the above second embodiment, effects similar to the first embodiment are achievable.

Moreover, generally, a moldless solenoid valve without the mold resin surrounding the bobbin and the coil in the coil part tends to accumulate heat inside the yoke more easily compared to a solenoid valve having the mold resin, and the temperature of the coil may increase. Therefore, generally, in the solenoid valve, it is difficult to eliminate the molding and make it moldless.

On the other hand, in the solenoid valve 200, the heat releasing sheet 123 is provided on the outer circumference of the coil 22, and a gap between the heat releasing sheet 123 and the yoke 11 is the first fluid passage 34 through which the working oil is guided. Therefore, in the solenoid valve 200 having no mold resin 23, it is possible to cool the heat-generating coil 22 by the flow of the working oil, and prevent the temperature increase of the coil part 120. Accordingly, it is possible to eliminate the molding from the solenoid valve 200, and allows for cost reduction and size reduction.

Moreover, in the solenoid valve 200, the coil 22 is prevented from coming into contact with contamination inside the working oil, by the working oil flowing along the outer circumference of the heat releasing sheet 123. Accordingly, with the solenoid valve 200 in which the coil 22 is not surrounded by the mold resin 23, providing the heat releasing sheet 123 prevents the temperature increase of the coil 22, and also protects the coil 22 from contamination.

The solenoid valve 200 according to the second embodiment may be a normally-closed type as with the solenoid valve 100 of the first embodiment. Moreover, the introduction passage 32 may communicate with the inlet passage 1A, and may communicate with the outlet passage 1B.

Moreover, the sheet part of the solenoid valve 200 according to the second embodiment is a heat releasing sheet 123 formed by resin material having excellent thermal conductivity (for example, polyimide resin). As long as the sheet part covers the outer circumference of the coil 22, the sheet part can be one other than the heat releasing sheet 123 formed by the resin material; for example, the sheet part may be a filter that does not allow the passing through of contamination.

In the above embodiments, the introduction passage 32 communicates with the inlet passage 1A or the outlet passage 1B. Instead, the introduction passage 32 may communicate with an inner space of the housing 1. That is to say, the introduction passage 32 may guide working oil from the inlet passage 1A or the outlet passage 1B as the working oil inside the housing 1, or may guide the working oil from the fluid chamber that communicates with the inlet passage 1A or the outlet passage 1B. In either case, it is preferable to form the introduction passage 32 that allows for cooling the coil 22 in a state in which electricity is passed through the coil 22, and the inlet passage 1A is disconnected from the outlet passage 1B.

Moreover, in the above embodiments, the solenoid valves 100 and 200 include the spool 2 as a valve body, and is what-is-called a spool type flow regulating valve that adjusts the opening of the inlet passage 1A and regulates the flow rate of the working oil. The solenoid valves 100 and 200 are not limited to this, and may be a poppet valve whose valve body is a poppet for example, or may be a directional control valve or a pressure control valve.

Embodiments of this invention were described above, but the above embodiments are merely examples of applications of this invention, and the technical scope of this invention is not limited to the specific constitutions of the above embodiments.

This application claims priority based on Japanese Patent Application No. 2014-180516 filed with the Japan Patent Office on Sep. 4, 2014, the entire contents of which are incorporated into this specification.

The invention claimed is:

1. A solenoid valve for controlling flow rate of working fluid, comprising:
  a housing having a valve passage through which working fluid flows;
  a valve body provided inside the housing in a movable manner, the valve body being configured to switch between an open state and a closed state of the valve passage;
  a coil part configured to generate magnetic force when electric current flows therethrough;
  a yoke surrounding the coil part;
  a stator core provided on an inner side of the coil part, the stator core being configured to be excited by magnetic force of the coil part;
  a shaft provided to be movable along an axial direction thereof with the valve body;
  a plunger fixed to the shaft, the plunger being configured to be movable in the axial direction by an attraction force acting between the plunger and the stator core;

a fluid passage provided on an outer side of the coil part, through which the working fluid passes;
an introduction passage communicating with the fluid passage, the introduction passage being configured to guide the working fluid inside the housing to the fluid passage;
a discharge passage communicating with the fluid passage, the discharge passage being configured to discharge the working fluid passed through the fluid passage outside the yoke; and
an inlet formed on an end of the yoke on a side in contact with the housing, the inlet being configured to guide working fluid from the introduction passage to the fluid passage, wherein
the valve passage is in the closed state when no electric current is passed through the coil part,
the introduction passage guides the working fluid flowing into or out from the housing, to the fluid passage, when the valve passage is in the open state as the electric current is passed through the coil,
the fluid passage has
  a first fluid passage formed between an outer circumference of the coil part and an inner circumference of the yoke, and
  a second fluid passage that allows the inlet to communicate with the first fluid passage, and
the discharge passage is formed on a bottom portion of the yoke on a side opposite to the end of the yoke on the side in contact with the housing, across the coil part.

2. The solenoid valve according to claim 1, wherein
the valve passage has an inlet passage through which working fluid flowing into the housing passes, and
the introduction passage communicates with the inlet passage.

3. The solenoid valve according to claim 1, wherein
the valve passage has an outlet passage through which working fluid flowing out from the housing passes, and
the introduction passage communicates with the outlet passage.

4. The solenoid valve according to claim 1, wherein the fluid passage is provided within the yoke.

5. The solenoid valve according to claim 1, wherein the inlet and the discharge passage are provided at positions shifted by 180° from each other in a circumferential direction of the yoke.

6. The solenoid valve according to claim 1, wherein
the coil part has:
  a cylindrical bobbin;
  a coil wound around the bobbin, the coil being configured to generate magnetic force when electric current flows therethrough; and
  a sheet part covering an outer circumference of the coil, wherein the first fluid passage is formed between an outer circumference of the sheet part and the inner circumference of the yoke.

7. The solenoid valve according to claim 6, wherein the sheet part is a heat releasing sheet.

8. A solenoid valve for controlling flow rate of working fluid, comprising:
a housing having a valve passage through which working fluid flows;
a valve body provided inside the housing in a movable manner, the valve body being configured to switch between an open state and a closed state of the valve passage;
a coil part configured to generate magnetic force when electric current flows therethrough;
a yoke surrounding the coil part;
a stator core provided on an inner side of the coil part, the stator core being configured to be excited by magnetic force of the coil part;
a shaft provided to be movable along an axial direction thereof with the valve body;
a plunger fixed to the shaft, the plunger being configured to be movable in the axial direction by an attraction force acting between the plunger and the stator core;
a fluid passage provided on an outer side of the coil part, through which the working fluid passes;
an introduction passage communicating with the fluid passage, the introduction passage being configured to guide the working fluid inside the housing to the fluid passage; and
a discharge passage communicating with the fluid passage, the discharge passage being configured to discharge the working fluid passed through the fluid passage outside the yoke;
an inlet formed on an end of the yoke on a side in contact with the housing, the inlet being configured to guide working fluid from the introduction passage to the fluid passage, wherein
the valve passage is in the open state when no electric current is passed through the coil part,
the introduction passage guides working fluid flowing into the housing to the fluid passage when the valve passage is in the open state as no electric current is passed through the coil,
the fluid passage has
  a first fluid passage formed between an outer circumference of the coil part and an inner circumference of the yoke, and
  a second fluid passage that allows the inlet to communicate with the first fluid passage, and
the discharge passage is formed on a bottom portion of the yoke on a side opposite to the end of the yoke on the side in contact with the housing, across the coil part.

9. The solenoid valve according to claim 8, wherein
the valve passage has an inlet passage through which working fluid flowing into the housing passes, and
the introduction passage communicates with the inlet passage.

10. The solenoid valve according to claim 8, wherein
the valve passage has an outlet passage through which working fluid flowing out from the housing passes, and
the introduction passage communicates with the outlet passage.

11. The solenoid valve according to claim 8, wherein the fluid passage is provided within the yoke.

12. The solenoid valve according to claim 8, wherein the inlet and the discharge passage are provided at positions shifted by 180° from each other in a circumferential direction of the yoke.

13. The solenoid valve according to claim 8, wherein
the coil part has:
  a cylindrical bobbin;
  a coil wound around the bobbin, the coil being configured to generate magnetic force when electric current flows therethrough; and a sheet part covering an outer circumference of the coil, wherein the first fluid passage is formed between an outer circumference of the sheet part and the inner circumference of the yoke.

14. The solenoid valve according to claim 13, wherein the sheet part is a heat releasing sheet.

\* \* \* \* \*